(12) United States Patent
Ogawa et al.

(10) Patent No.: US 6,881,332 B1
(45) Date of Patent: Apr. 19, 2005

(54) SEWAGE TREATMENT APPARATUS

(75) Inventors: Hiroshi Ogawa, Urawa (JP); Kazuyuki Akiya, Omiya (JP)

(73) Assignee: Earthclean Co., Ltd. (JP)

( * ) Notice: Subject to any disclaimer, the term of this patent is extended or adjusted under 35 U.S.C. 154(b) by 252 days.

(21) Appl. No.: 10/069,207

(22) PCT Filed: Aug. 31, 2000

(86) PCT No.: PCT/JP00/05942

§ 371 (c)(1),
(2), (4) Date: Feb. 21, 2002

(87) PCT Pub. No.: WO01/15826

PCT Pub. Date: Mar. 8, 2001

(30) Foreign Application Priority Data

Sep. 1, 1999 (JP) .......................................... 11-247986

(51) Int. Cl.⁷ ................................................ C02F 3/02
(52) U.S. Cl. ...................... 210/202; 210/218; 210/219; 210/220

(58) Field of Search ................................ 210/202, 218, 210/219, 220

(56) References Cited

FOREIGN PATENT DOCUMENTS

| JP | 01-124832 | 8/1989 |
|----|-----------|--------|
| JP | 08-1132 | 1/1996 |
| JP | 08-10792 | 1/1996 |
| JP | 08-197038 | 8/1996 |
| JP | 10-156325 | 6/1998 |

Primary Examiner—Blaine Copenheaver
Assistant Examiner—Douglas J. Theisen
(74) Attorney, Agent, or Firm—Hayes Soloway P.C.

(57) ABSTRACT

In the present invention, solid contents 38, which are collected by a solid-liquid separation device 33 in a solid-liquid separation tank 14 and charged into a decomposing treatment tank 11, are decomposed to water and $CO_2$ by the action of aerobic microbes and the air (oxygen) supplied from a lower aeration tank 12 and substantially disappear. The oil contents contained in the water having been decomposed is removed by an oil-water separation tank 13.

7 Claims, 4 Drawing Sheets

SEWAGE TREATMENT APPARATUS

TECHNICAL FIELD

The present invention relates to a sewage treatment apparatus for effectively treating waste water discharged from collective housing such as mansions, hotels, restaurants, hospitals, housing complexes, food factories, and the like, in particular, sewage containing solid materials such as kitchen garbage, and the like that are ground by a disposer and discharged.

BACKGROUND ART

Recently, kitchen garbage, and the like generated in the mansions, and so on as described above are ground by a disposer and discharged together with waste water. Thus, the amount of sludge generated tends to increase, and a problem arises in a method of treating the sludge.

A conventional method of treating sludge is such a system that the sewage discharged from the disposers, kitchens, rest rooms, and so on of mansions, and the like, is stored once in a collective inlet, supplied to a combined water-purifier tank located downstream by a pump, and sequentially purified therein.

In the above treatment method, the sludge having deposited in the collective inlet is also supplied into the combined water-purifier tank and deposits therein. Thus, the treatment capacity of the tank cannot cope with the amount of sludge deposited therein and the deposited sludge must be discharged frequently.

Further, the collected sludge must be subjected to post-treatment such as incineration, and the like, which not only increases the treatment cost of the sludge but also may cause a problem of environmental pollution such as dioxin and the like.

A treatment system as schematically shown in FIG. 4 is in practical use as a treatment method of solving the above problem.

Sewage discharged from a disposer 02 of collective housing 01 such as a mansion or the like is stored once in storage tank 03, supplied to a dehydrator 05 by a pump 04 so as to separate solid contents from liquid contents, the solid contents are charged into a fermenting device 06 and made to compost 07, and the compost 07 is taken out.

In contrast, the discharge water discharged from the dehydrator 05 is fed into an oil-water separation tank 08 so that oil contents are removed therefrom, and then discharged into a public sewer.

The treatment system arranged as described above yet has the following problem. Since the solid contents contained in all the sludge containing sewage in the storage tank 03 is separated from liquid contents using the dehydrator 05, the solid contents are generated in a large amount. Thus, a long time is necessary to make the solid contents into compost in the fermenting tank 06 as well as it is time-consuming to handle and post treat the compost, and a recycling cost is also expensive. Further, since the discharge water the solid contents of which are separated from the liquid contents and which contains the oil contents, is supplied to the oil-water separation tank or the public sewer, a large load is applied thereon. Further, since the dehydrator 05, the fermenting tank 06, and the oil-water separation tank 08 are independently installed, respectively, the size of a treatment apparatus is increased as a whole, and a large installation space is required.

Accordingly, it is an object of the present invention, which was made to solve the above problem, to provide a sewage treatment apparatus for effectively decomposing only solid contents that are obtained by being separated from liquid contents in a short time, substantially reducing the amount of compost and the like generated, decreasing a load applied to a sewage treatment facility, and reducing the overall size of the sewage treatment apparatus by integrating a plurality of processing means as a unit.

DISCLOSURE OF THE INVENTION

To achieve the above object, a sewage treatment apparatus of the present invention is characterized in that the apparatus includes a solid-liquid separation tank for receiving sewage containing crushed solid contents and collecting the solid contents by solid-liquid separation means therein; a decomposing treatment tank disposed under the solid-liquid separation tank for receiving the collected solid contents and decomposing the solid contents by aerobic microbes; stirring means for the solid contents disposed in the decomposing treatment tank; and an aeration tank disposed under the bottom plate, which has a plurality of air holes, in the decomposing treatment tank for supplying air or oxygen into the decomposing treatment tank through the air holes of the bottom plate by bubbling stored water by air or oxygen.

According to the present invention arranged as described above, the solid contents, which have been collected by the solid-liquid separation means and charged into the decomposing treatment tank, are decomposed to water and $CO_2$ by the action of aerobic microbes and air (oxygen) that is supplied from the lower aeration tank and substantially disappear. Thus, compost, and the like are not generated in a large amount.

Further, since the solid-liquid separation tank, the decomposing treatment tank, the aeration tank, and the like are integrated with each other as a single unit, the size of the treatment apparatus can be reduced as a whole.

In the treatment apparatus, it is preferable that the solid-liquid separation means be an endless rotationally traveling type solid-liquid separation device that includes a conveyer belt endlessly rotationally traveling in an obliquely up and down direction; a comb-shaped sieve plate disposed so as to cover the upper surface of the conveyer belt and composed of a multiplicity of rod-shaped members disposed longitudinally at minute intervals in the width direction of the belt; and a multiplicity of transportation projections projecting on the upper surface of the conveyer belt at predetermined intervals and sliding between the respective rod-shaped members of the comb-shaped sieve plate.

With this arrangement, the solid contents are sequentially a and continuously collected and charged into the decomposing treatment tank, and thereby a sewage treatment capability can be improved.

In the treatment apparatus, it is preferable to dispose water spray means to an upper portion in the separation treatment tank.

With this arrangement, the water supplied to the solid contents by the water spray means activates the breeding of the aerobic microbes, and thereby the solid contents are effectively decomposed.

In the treatment apparatus, it is preferable to dispose an oil-water separation tank that communicates with a lower portion of the aeration tank on a side adjacent to the separation treatment tank.

With this arrangement, since water, which has been decomposed, is discharged after the oil contents contained in the water are removed therefrom, loads applied to a downstream sewage treatment facility, and the like can be reduced.

In the treatment apparatus, it is preferable to set the water level in the aeration tank higher than the bottom plate of the decomposition treatment tank.

With this arrangement, bubbling is performed also above the air holes of the bottom plate, which prevents the air holes from being clogged by the solid contents.

In the treatment apparatus, it is preferable to discharge at least a part of the sewage, from which solid contents have been removed in the solid-liquid separation device, into the oil-water separation tank.

With this arrangement, since the sewage is discharged into the downstream sewage treatment facility, and the like after the oil contents are removed therefrom, loads applied thereto can be reduced.

In the treatment apparatus, it is preferable to flow the exhaust gas from the separation treatment tank into the oil-water separation tank or into air feed pipes to the aeration tank.

With this arrangement, the odors in the decomposing treatment tank are not discharged into atmosphere, which prevents residential environments from being deteriorated.

BEST MODE FOR CARRYING OUT THE INVENTION

An embodiment of the present invention will be described below based on the drawings.

Figure 1:
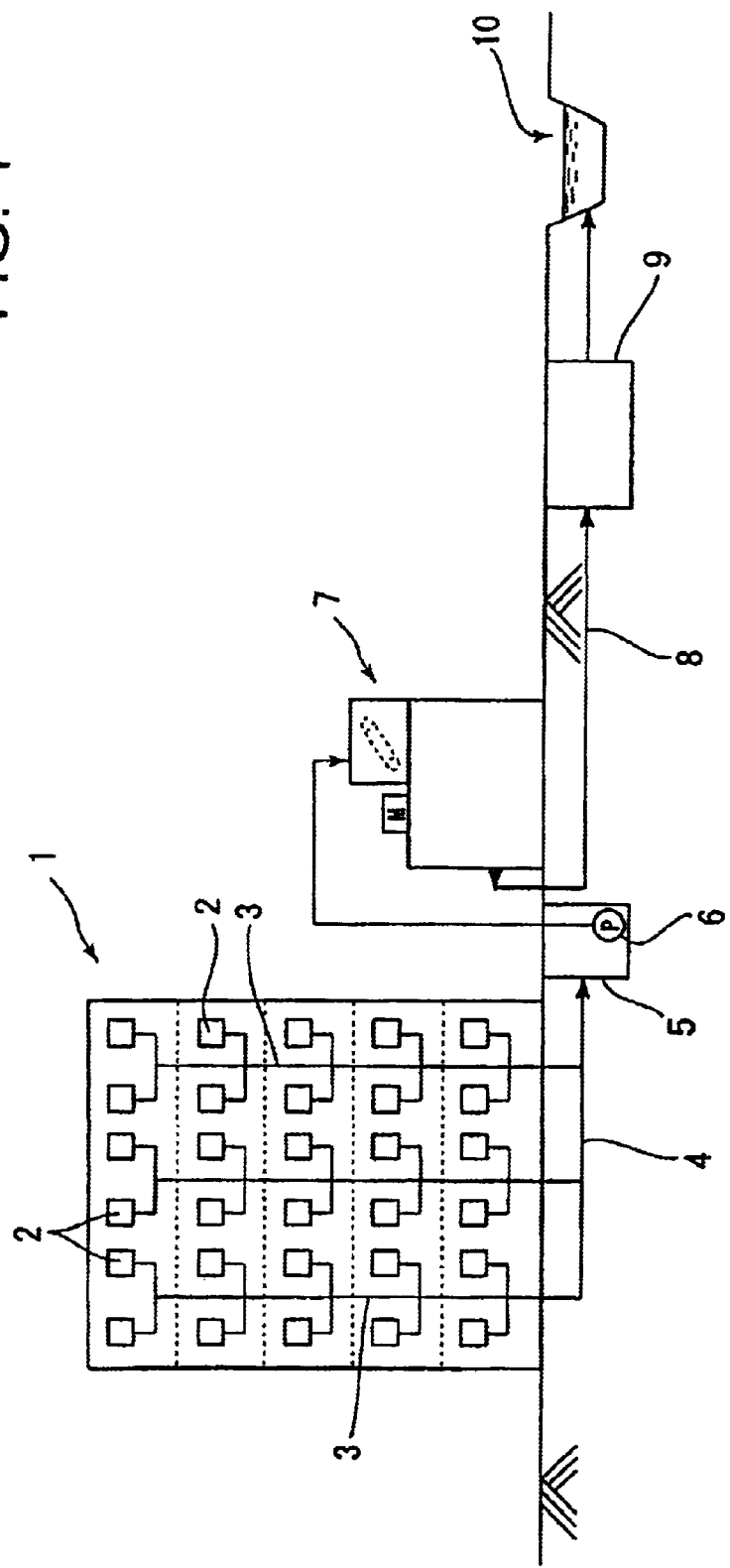
FIG. 1 is a schematic view showing a sewage purifying system to which the present invention is applied.

FIG. 1 schematically shows an example of a sewage treatment system to which the sewage treatment apparatus of the present invention is applied, wherein reference numeral 1 denotes collective housing such as a mansion, reference numeral 2 denotes disposers 2 installed in respective households, reference numeral 3 denotes sewage pipes connected to the disposers 2, rest rooms, kitchens, and the like(none of them are illustrated), reference numeral 4 denotes an underground collective sewage pipe connected to the respective sewage pipes 3.

After the sewage from the collective sewage pipe 4 is fed into a water tank 5, it is pumped up by a pump 6, and supplied to the sewage treatment apparatus 7 of the present invention. Discharge water, which is obtained by separating the solid contents and the oil contents in the sewage therefrom, is fed to a public sewage treatment facility 9 through a discharge pipe 8, and the discharge water having been purified in the facility is discharged to a river 10, and the like through.

Figure 2:
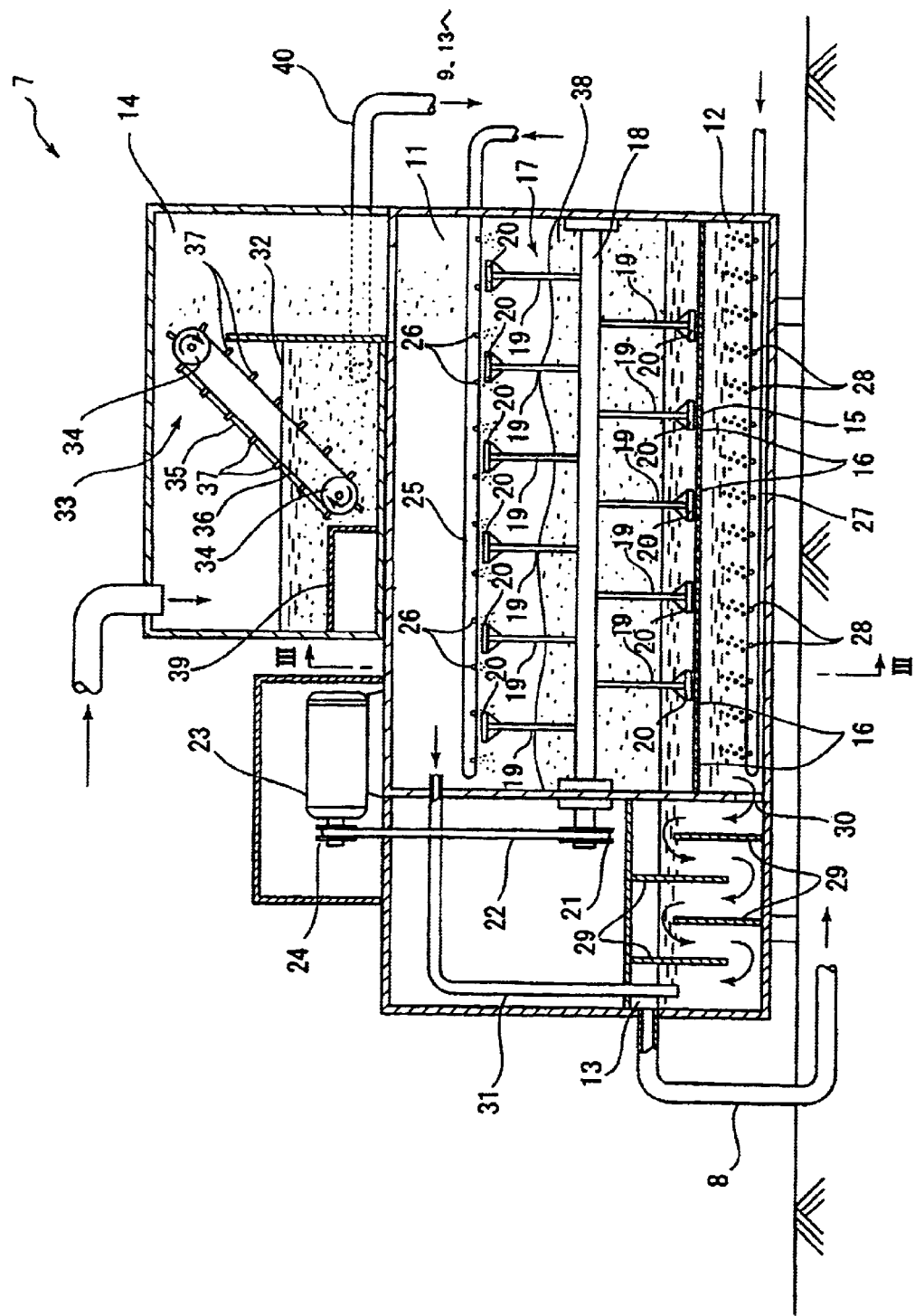
FIG. 2 is a longitudinal side elevational view showing an embodiment of the present invention.
Figure 3:
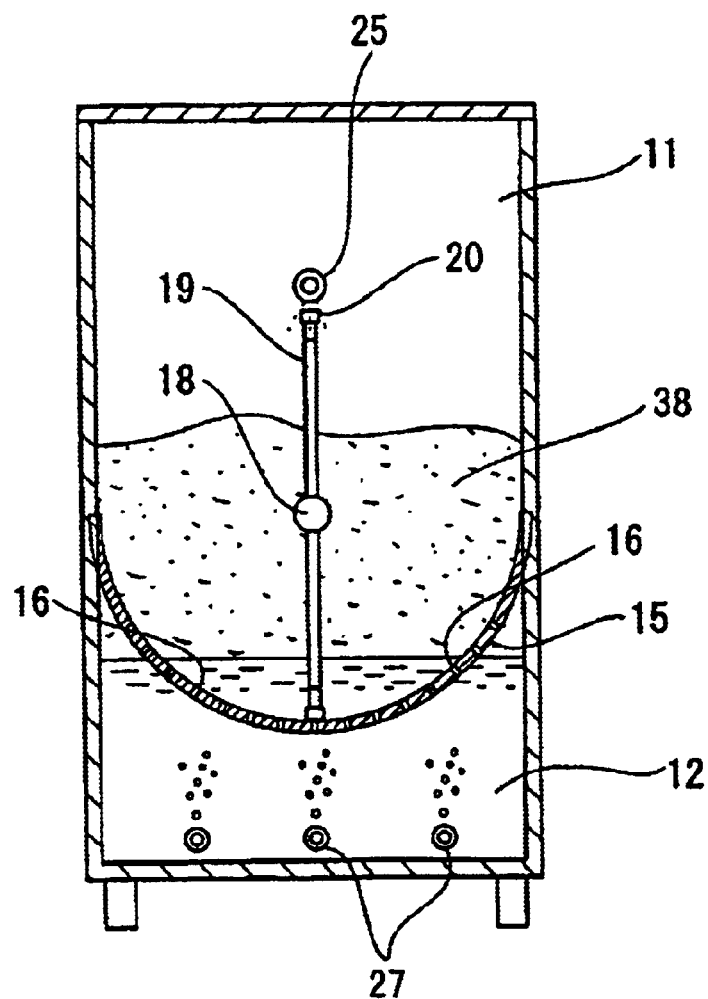
FIG. 3 is a longitudinal front elevational view of the embodiment taken long the line III—III of FIG. 2.
Figure 4:
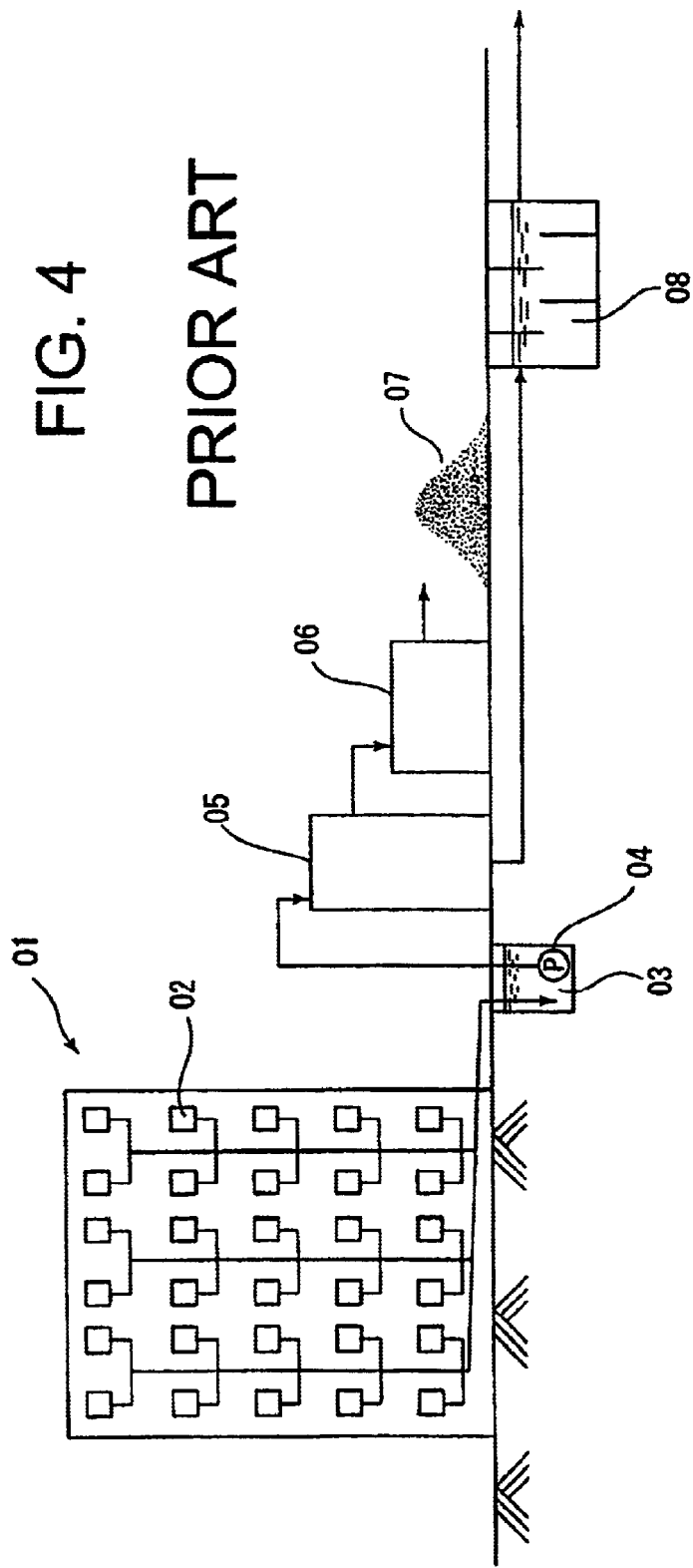
FIG. 4 is a schematic view of a conventional sewage treatment system.

FIGS. 2 and 3 show the longitudinal side elevational view of the sewage treatment apparatus 7 and the longitudinal front elevational view of the main portion thereof, respectively.

In both the figures, the sewage treatment apparatus 7 is composed of a solid content decomposing treatment tank 11 formed in a laterally long rectangular shape, an aeration tank 12 disposed a, below the decomposing treatment tank 11, an oil-water separation tank 13 disposed on the lower left side of the decomposing treatment tank 11, and a solid-liquid separation tank 14 disposed on the decomposing treatment tank 11. These tanks are integrated with each other as a single unit.

The bottom plate 15 of the decomposing treatment tank 11 is composed of a porous plate such as a punching plate having a multiplicity of small air holes (for example, a diameter of about 1 mm), and is formed in a U-shape when it is viewed from a front side.

A stirring device 17 is disposed at substantially the center in the decomposing treatment tank 11. The stirring device 17 is composed of a rotating shaft 18, which is supported by housing at both the ends thereof and faces in a right and left direction, and a plurality of stirring rods 19 secured facing in the direction perpendicular to the axial line of the rotating shaft 18. A plurality of stirring blades 20 are mounted on each of the stirring rods 19.

The rotating shaft 18 is rotated at a low speed by a belt 22 that is trained around a pulley 21 mounted on the left end of the rotating shaft 18 and around the drive pulley of a geared motor 23 mounted on the decomposing treatment tank 11.

A water spray pipe 25 is disposed in the decomposing treatment tank 11 at a portion near to the upper side thereof so as to face in a right and left direction. Water is sprayed in a shower state from the plurality of outlet hoes 26 defined through the lower end of the water spray pipe 25.

A plurality of air supply pipes 27 are disposed in the aeration tank 12 at a lower portion thereof so as to face in a right and left direction, and compressed air is blown out from the blow-out holes 28 defined through the upper surfaces of the air supply pipes 27.

That is, water is stored in the aeration tank 12 and bubbled by the air supplied from the blow-out holes 28, and the bubbles flow into the decomposing treatment tank 11 through the air holes 16 of the bottom plate 15 so as to supply air (oxygen) into the decomposing treatment tank 11.

Note that the water level in the aeration tank 12 is set slightly higher than the air holes 16 of the bottom plate 15. This arrangement is made to prevent the clogging of the air holes 16 by causing the bubbling also above the air holes 16 of the bottom plate 15 therethrough.

The oil-water separation tank 13 includes a plurality of partition walls 29 secured alternately with a slight gap defined therebetween so that a flow path is formed between upper plates and lower plates thereof, and a rightmost tank communicates with the lower portion of the aeration tank 12 at the lower end thereof through an air hole 30.

The sewage containing the oil contents, which flows from the aeration tank 12 into the rightmost tank overflows the upper end of a partition wall 29 and flows into a left tank adjacent to the rightmost tank and further flows into the next tank passing through the flow path under the left tank. The sequential repetition of this operation causes the oil contents to float and to be separated, and only the purified discharge water is discharged from a leftmost tank through the discharge pipe 8.

An exhaust pipe 31 is connected between the upper portion of the oil-water separation tank 13 and the upper portion of the decomposing treatment tank 11 so that the odor containing gas, which is generated in the decomposing treatment tank 11, is dissolved in the discharge water in the oil-water separation tank 13 and discharged from the discharge pipe 8 to prevent the gas from being discharged in atmosphere.

Note that the exhaust pipe 31 may be connected to the air supply pipes 27 and circulated in the decomposing treatment tank 11 together with air.

A known endless rotationally traveling type solid-liquid separation device 33 as disclosed in, for example, Japanese patent No. 2719869 is disposed in a sewage tank 32 installed in the solid-liquid separation tank 14 at an angle. Further, a drain pipe 40 is disposed in the solid-liquid separation tank 14 to discharge the sewage into the oil-water separation tank 13 and the public sewage treatment facility 9.

The solid-liquid separation device 33 is composed a conveyer belt 35, which is trained around a pair of rollers 34 rotatably supported at the upper and lower portions of a conveyer frame (not shown), and a comb-shaped sieve plate 36, which is secured to the conveyer frame so as to cover the upper surface of the conveyer belt 35. The comb-shaped sieve plate 36 is composed of a multiplicity of round rods or squire rods disposed longitudinally at small intervals in a width direction. A multiplicity of transportation projections 37, which are slidably engaged between the respective rods of the comb-shaped sieve plate 36 and project upward, are disposed on the surface of the conveyer belt 35 at predetermined intervals.

The solid contents collected by the comb-shaped sieve plate 36 are scooped up by the transportation projections 37 that rotatably travel sequentially upward, fall from the upper end of the sieve plate 36, and are charged into the decomposing treatment tank 11.

Further, a step section 39 is disposed at a lower portion of the sewage tank 32 which permits the solid-liquid separation device 33 to approximately reliably separate the solid contents in the sewage.

Next, sewage treatment steps performed by the treatment apparatus 7 of the embodiment will be described below.

When the sewage discharged from the collective housing 1 shown in FIG. 1 flows into the water tank 5, the sewage is fed into the sewage treatment tank 32 in the solid-liquid separation tank 14 of the treatment apparatus 7 by the pump 6.

When the sewage is fed into the sewage tank 32, relatively large solid contents contained in the sewage are collected by the comb-shaped sieve plate 36 of the solid-liquid separation device 33 and scooped up by the transportation projections 37, which endlessly rotationally travel, and fall into the lower decomposing treatment tank 11.

In contrast, the sewage, in which the solid contents have been separated from liquid contents by passing through the comb-shaped sieve plate 36, is entirely discharged into the oil-water separation tank 13 so as to separate oil contents therefrom, when the sewage treatment apparatus is installed in collective housing, and the like of a small scale where the amount of sewage to be treated is small. Whereas, when the sewage treatment apparatus is installed in collective housing, and the like of a large scale where a large amount of sewage is treated, a part of the sewage from which the solid contents have been separated is fed into the oil-water separation tank 13, and the remaining amount of the sewage is discharged into an oil-water separator (not shown) installed downstream or into the public sewage treatment facility 9 and treated therein.

The sewage having been fed into the oil-water separation tank 13 is discharged after the oil contents are removed therefrom, a load applied to the downstream public sewage treatment facility 9 is reduced.

The solid contents 38 having been charged into the decomposing treatment tank 11 in a predetermined amount will be a treated as described below.

First, aerobic microbes (bacteria), a neutralizing agent, a deodorant agent, and the like are added to the charged solid contents 38, and stirred with the stirring device 17 and blended.

Subsequently, water is sprayed to the solid contents 38 by the water spray pipe 25 as well as the water stored in the aeration tank 12 is bubbled by the air ejected from the air supply pipes 27, and air (oxygen) is continuously supplied to the solid contents 38 through the air holes 16 of the bottom plate of the decomposing treatment tank 11.

As described above, since the water level in the aeration tank 12 is set at the position higher than the bottom plate 15, the air holes 16 of the bottom plate 15 are prevented from being clogged by the bubbling.

When the water spray from the water spray pipe 25 and the stirring of the solid contents 38 with the stirring device 17 are repeatedly performed at predetermined intervals, the charged solid contents 38 are gradually decomposed to water and $CO_2$, and finally the solid contents approximately completely disappear.

Gases and odors generated by the decomposition flow out from the exhaust pipe 31, is dissolved in the discharge water flowing out in the oil-water separation tank 13 and discharged. Accordingly, any gases-that emit odors are not discharged into atmosphere.

In contrast, the water having been subjected to the decomposition treatment, that is, the sewage flows down into the aeration tank 12 from the air holes 16 of the bottom plate 15, is blended with the water in the aeration tank 12, and flows into the oil-water separation tank 13 from the passing-through hole 30.

The oil contents contained in the sewage, which flow into the oil-water separation tank 13, are removed while the sewage overflows the respective partition walls 29 and flows leftward, and then discharged into the public sewage treatment facility 9 from the discharge pipe 8.

As described above, in the sewage treatment apparatus of the embodiment, sewage containing solid contents, which have been ground by a disposer, is directly fed into the sewage tank 32 of the solid-liquid separation tank 14 by the pump 6, the solid contents in the sewage are collected by the solid-liquid separation device 33 installed in the sewage treatment tank 32, and the solid contents 38 are charged into the decomposing treatment tank 11 and decomposed into water and $CO_2$. Accordingly, compost and the like, which are conventionally generated, are not almost generated, and thereby a cost required in post treatment and recycle can be greatly reduced.

Further, sewage that contains oil contents after it has been decomposed is discharged after the sewage flows into the oil-water separation tank 13 and the oil contents are removed therefrom. Thus, loads applied to the different oil separation tank and the public sewage treatment facility that are disposed downstream can be reduced.

The present invention is by no means limited to the above embodiment and can be arranged as various embodiments.

While the stirring device 17 is described as a lateral type stalled horizontally, it may be arranged as a longitudinal type which the rotating shaft 18 of the stirring device 17 is disposed vertically.

What is claimed is:

1. A sewage treatment apparatus, comprising:
   a solid-liquid separation tank for receiving sewage containing crushed solid contents and collecting the solid contents by solid-liquid separation means therein;

a decomposing treatment tank disposed under the solid-liquid separation tank for receiving the collected solid contents and decomposing the solid contents by aerobic microbes;

stirring means for the solid contents disposed in the decomposing treatment tank; and an aeration tank disposed under the bottom plate which has a plurality of air holes, in the decomposing treatment tank for supplying air or oxygen bubbling in stored water into the decomposing treatment tank through the air holes of the bottom plate.

2. A sewage treatment apparatus according to claim 1, wherein the solid-liquid separation means is an endless rotationally traveling type solid-liquid separation device that comprises:

a conveyer belt endlessly rotationally traveling in an obliquely up and down direction;

a comb-shaped sieve plate disposed so as to cover the upper surface of the conveyer belt and composed of a multiplicity of rod-shaped members disposed longitudinally at minute intervals in the width direction of the belt; and a multiplicity of transportation projections projecting on the upper surface of the conveyer belt at predetermined intervals and sliding between the respective rod-shaped members of the comb-shaped sieve plate.

3. A sewage treatment apparatus according to claim 2, wherein water spray means is disposed to an upper portion in the separation treatment tank.

4. A sewage treatment apparatus according to claim 3, wherein an oil-water separation tank that communicates with a lower portion of the aeration tank is disposed on a side adjacent to the separation treatment tank.

5. A sewage treatment apparatus according to claim 1, wherein the water level in the aeration tank is set higher than the bottom plate of the decomposition treatment tank.

6. A sewage treatment apparatus according to claim 4, wherein at least a part of the sewage, from which solid contents have been removed in the solid-liquid separation device, is discharged into the oil-water separation tank.

7. A sewage treatment apparatus according to claim 1, wherein the exhaust gas from the separation treatment tank is flown into the oil-water separation tank or into air feed pipes to the aeration tank.

* * * * *

UNITED STATES PATENT AND TRADEMARK OFFICE
CERTIFICATE OF CORRECTION

PATENT NO. : 6,881,332 B1
DATED : April 19, 2005
INVENTOR(S) : Ogawa et al.

It is certified that error appears in the above-identified patent and that said Letters Patent is hereby corrected as shown below:

<u>Title page,</u>
Item [57], ABSTRACT,
Line 1, "In the present invention, solid contents 38" should be -- A sewage treatment apparatus in which solid contents --.
Line 2, "device 33 in" should be -- device in --.
Line 3, "tank 14 and" should be -- tank and --.
Line 4, "tank 11, are" should be -- tank, are --.
Line 6, delete "12 and substantially disappear".
Line 8, "separation tank 13" should be -- separation tank --.

<u>Column 6,</u>
Line 66, "crushed" should be -- ground --.
Line 67, "separation means therein" should be -- separation device --.

<u>Column 7,</u>
Line 5, "stirring means" should be -- a stirrer --.
Line 6, delete the word "and".
Line 7, insert -- a bottom plate of the decomposing treatment tank, the bottom plate having a plurality of holes; and --.
Line 11, "the air holes" should be -- the holes --.
Line 13, "means" should be -- device --.
Line 18, "cover the" should be -- cover an --.
Line 21, "the width" should be -- a width --.

UNITED STATES PATENT AND TRADEMARK OFFICE
CERTIFICATE OF CORRECTION

PATENT NO. : 6,881,332 B1
DATED : April 19, 2005
INVENTOR(S) : Ogawa et al.

It is certified that error appears in the above-identified patent and that said Letters Patent is hereby corrected as shown below:

<u>Column 8,</u>
Line 6, "spray means" should be -- sprayer --; and "disposed to" should be
-- disposed in --.
Lines 7 and 11, "separation" should be -- decomposing --.
Line 14, "decomposition" should be -- decomposing --.
Line 19, "claim 1" should be -- claim 4 --.
Line 20, "wherein the exhaust gas from the separation treatment tank" should be
-- wherein gas generated in the decomposing treatment tank --.

Signed and Sealed this

Twenty-first Day of March, 2006

JON W. DUDAS
*Director of the United States Patent and Trademark Office*